Jan. 12, 1971     H. E. COOTES     3,553,836
METHOD AND APPARATUS FOR TERMINATING CABLE
Filed May 21, 1969     11 Sheets-Sheet 1
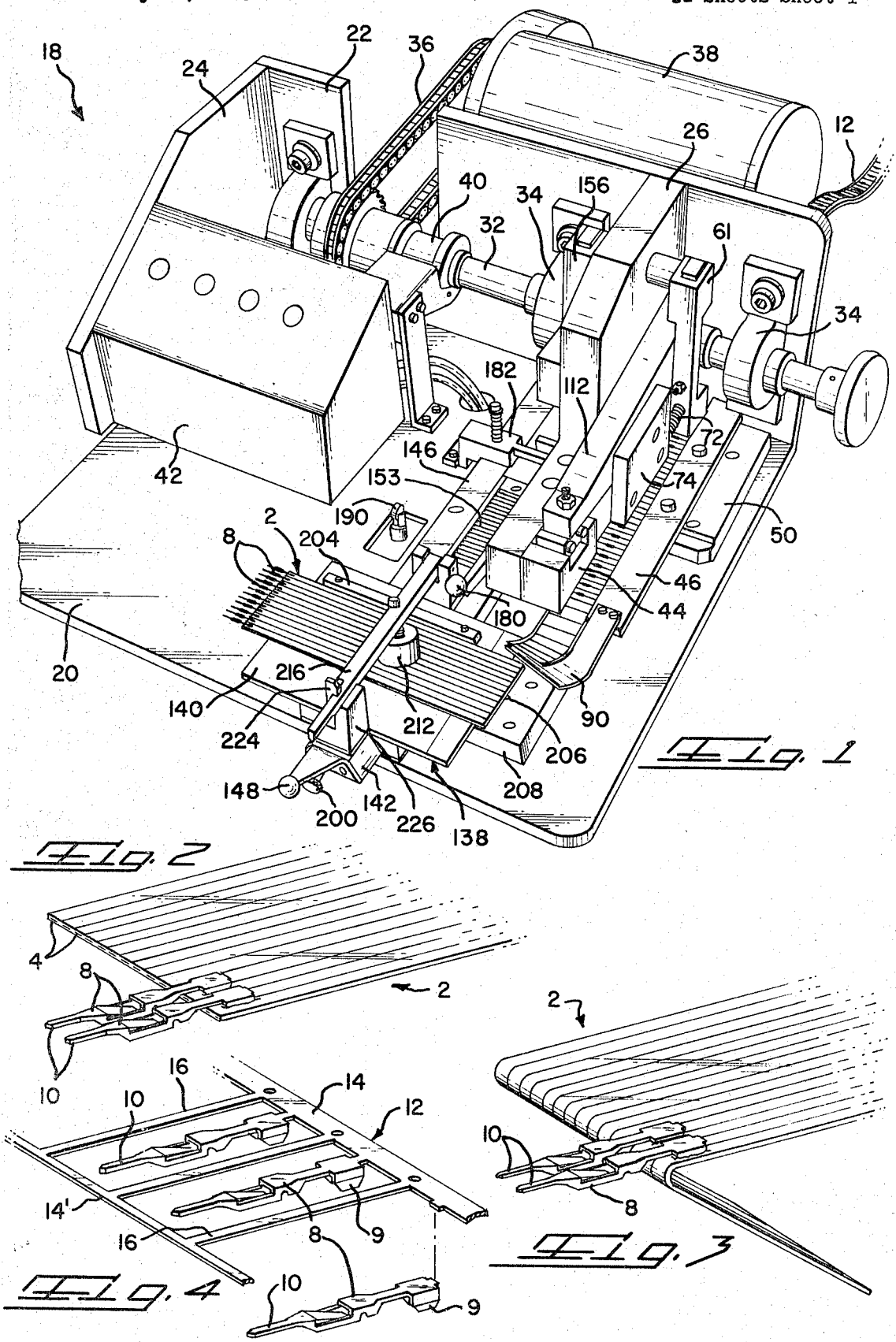

Jan. 12, 1971  H. E. COOTES  3,553,836
METHOD AND APPARATUS FOR TERMINATING CABLE
Filed May 21, 1969  11 Sheets-Sheet 2
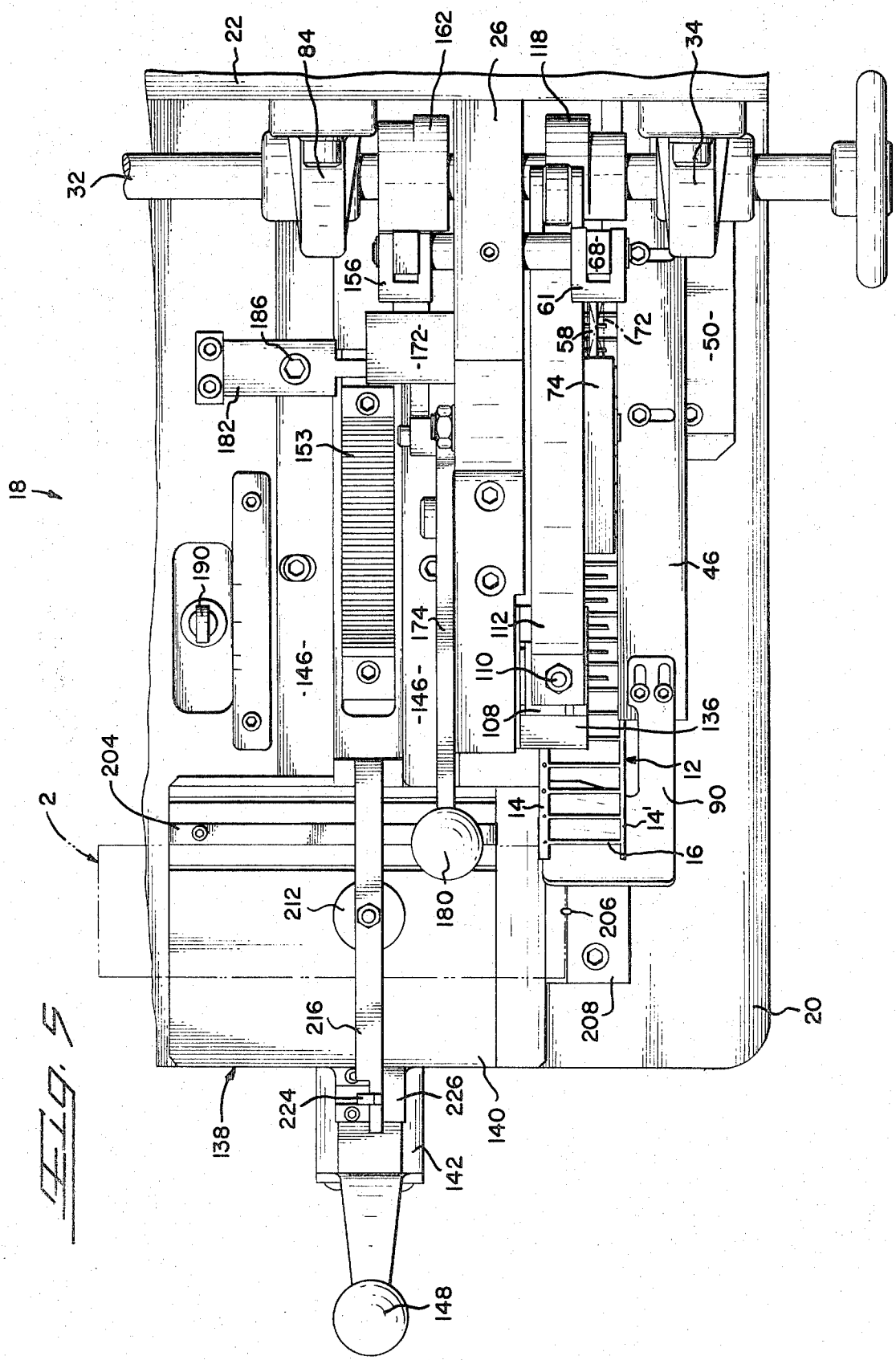

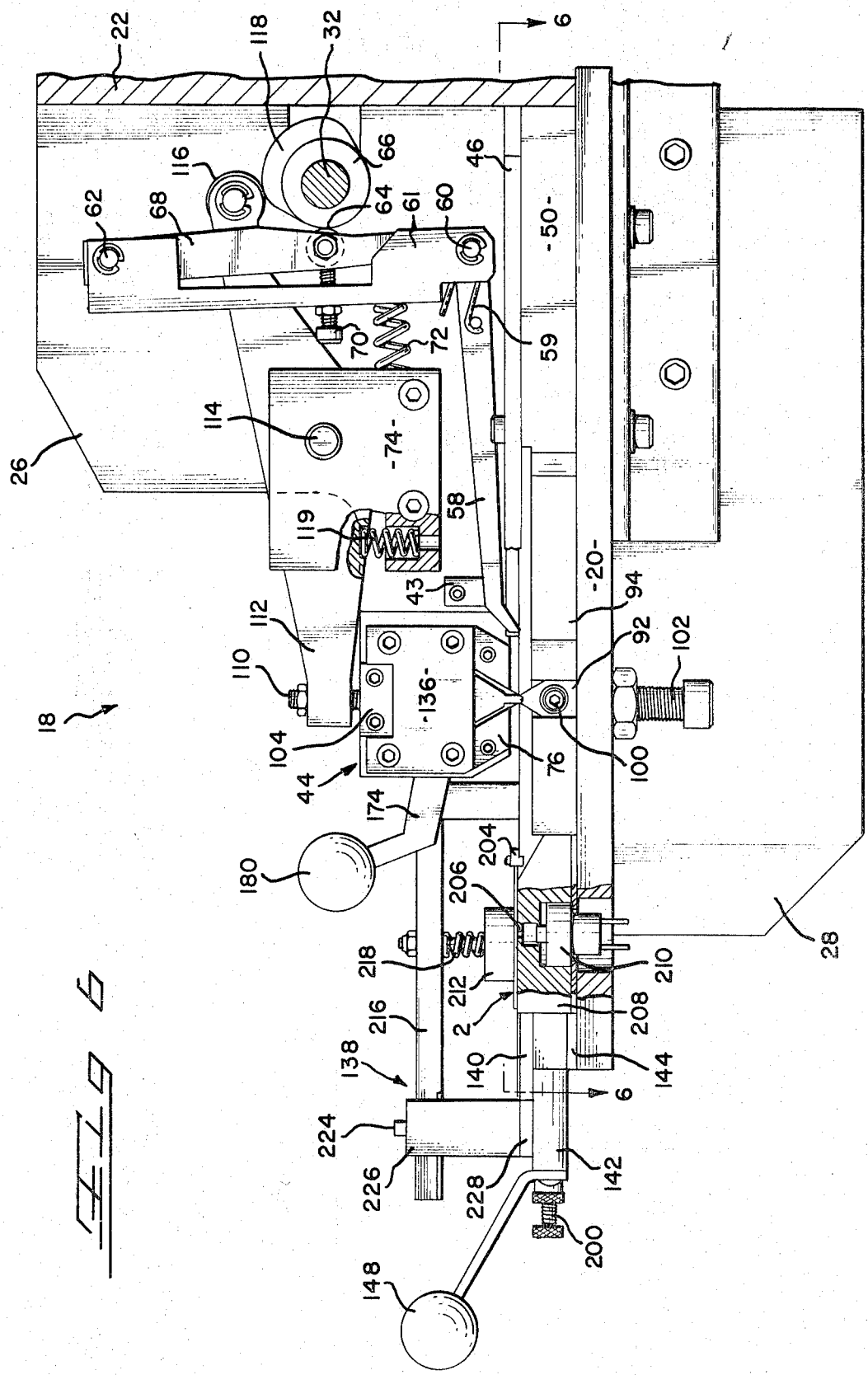

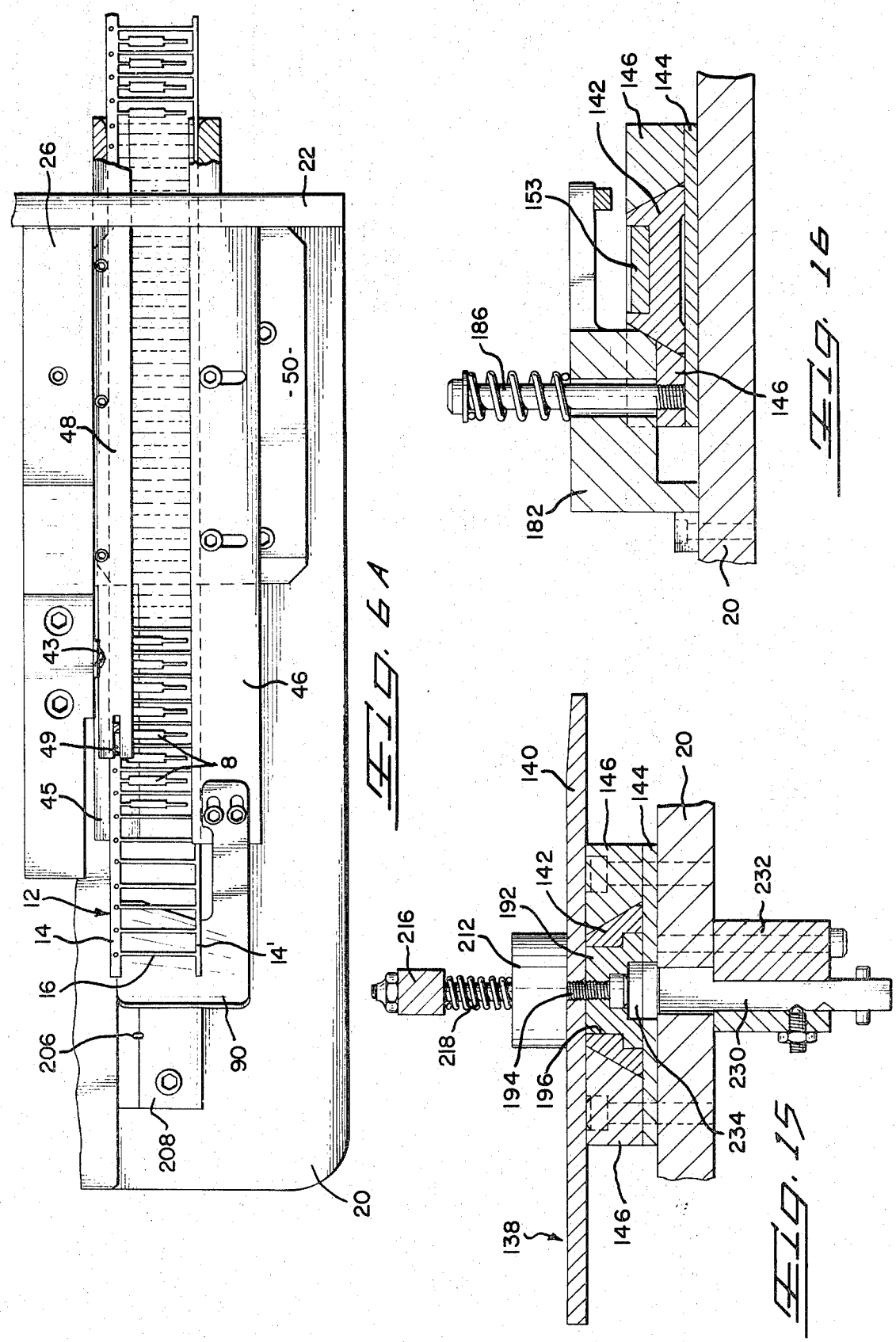

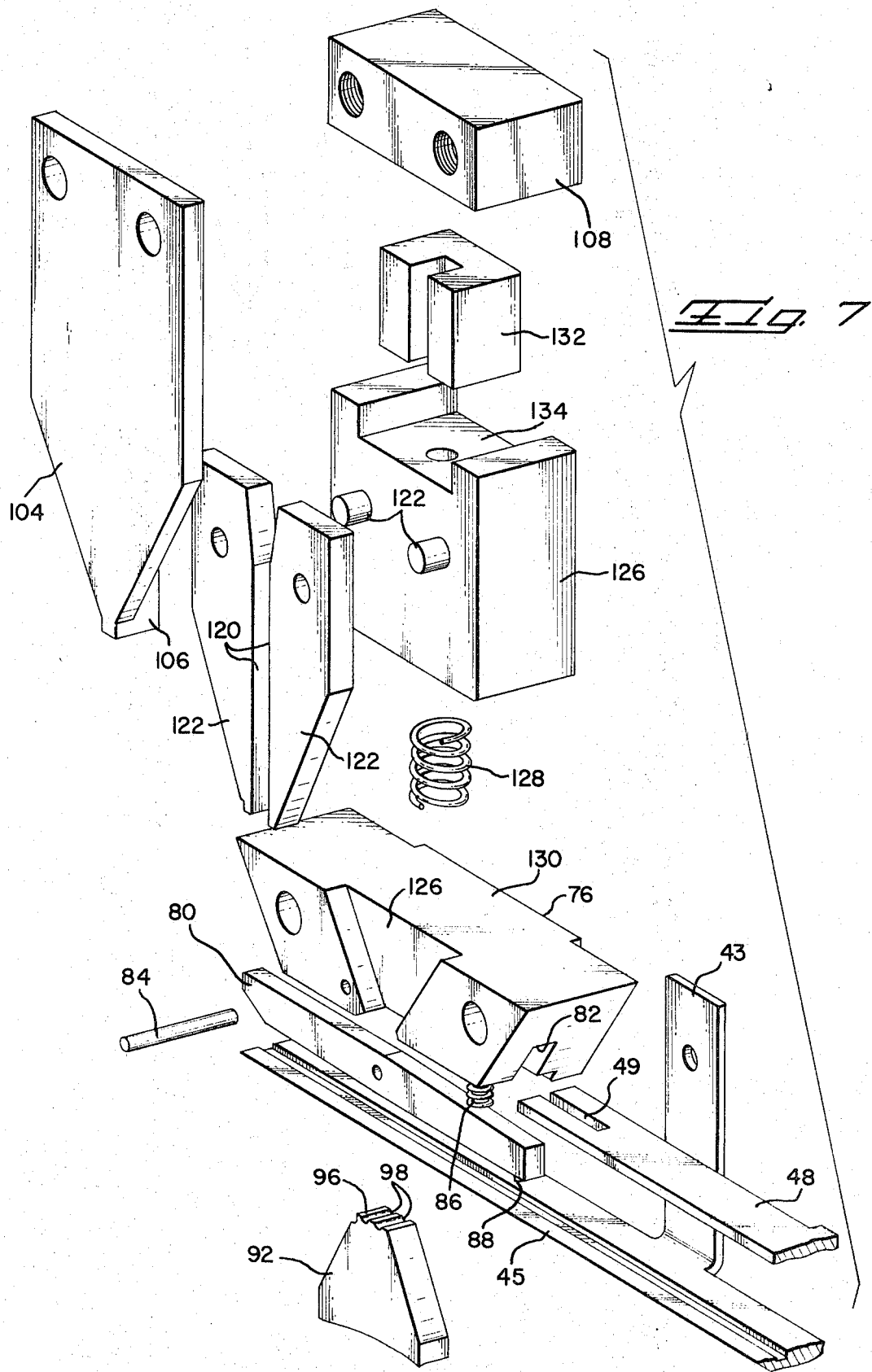

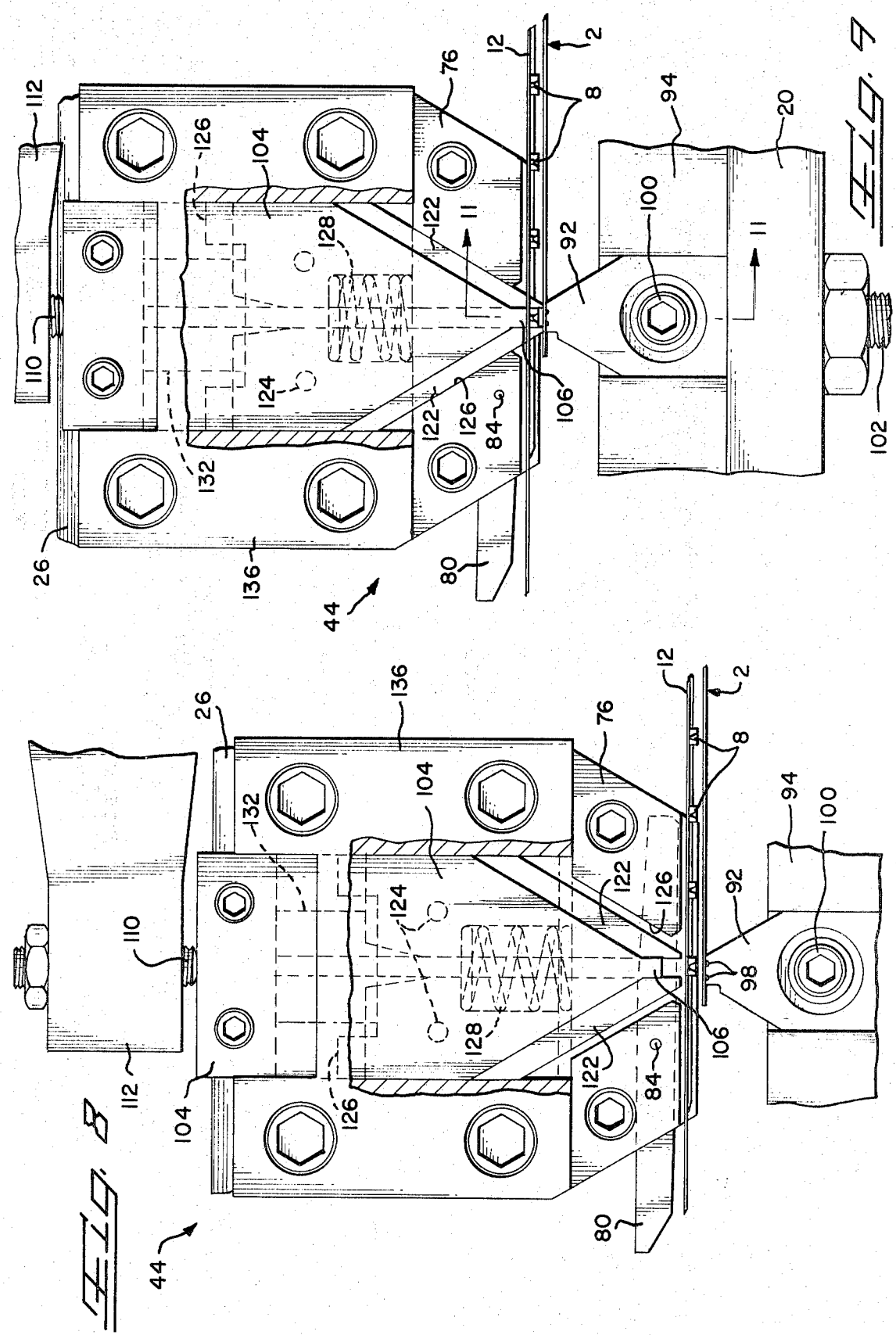

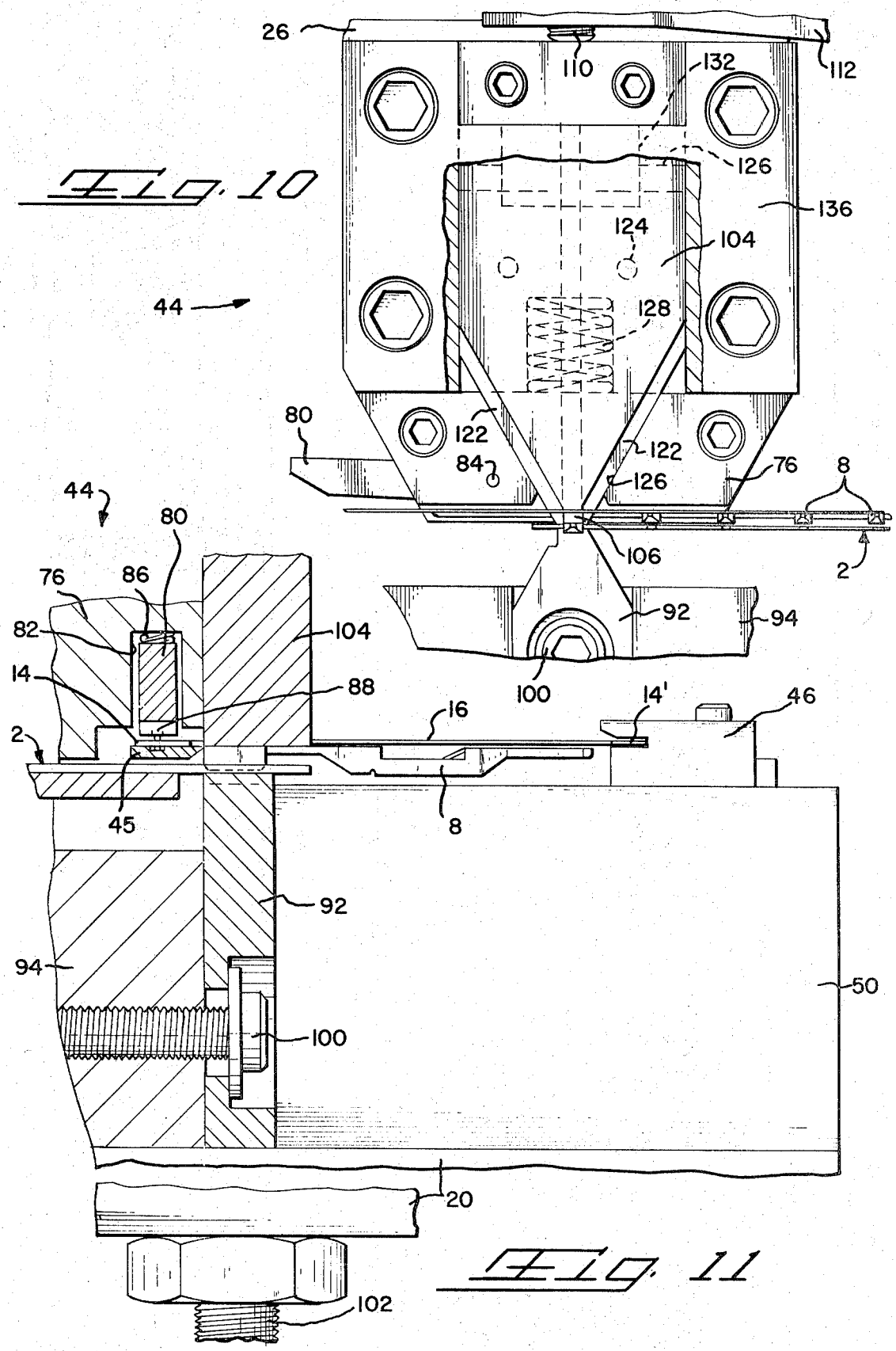

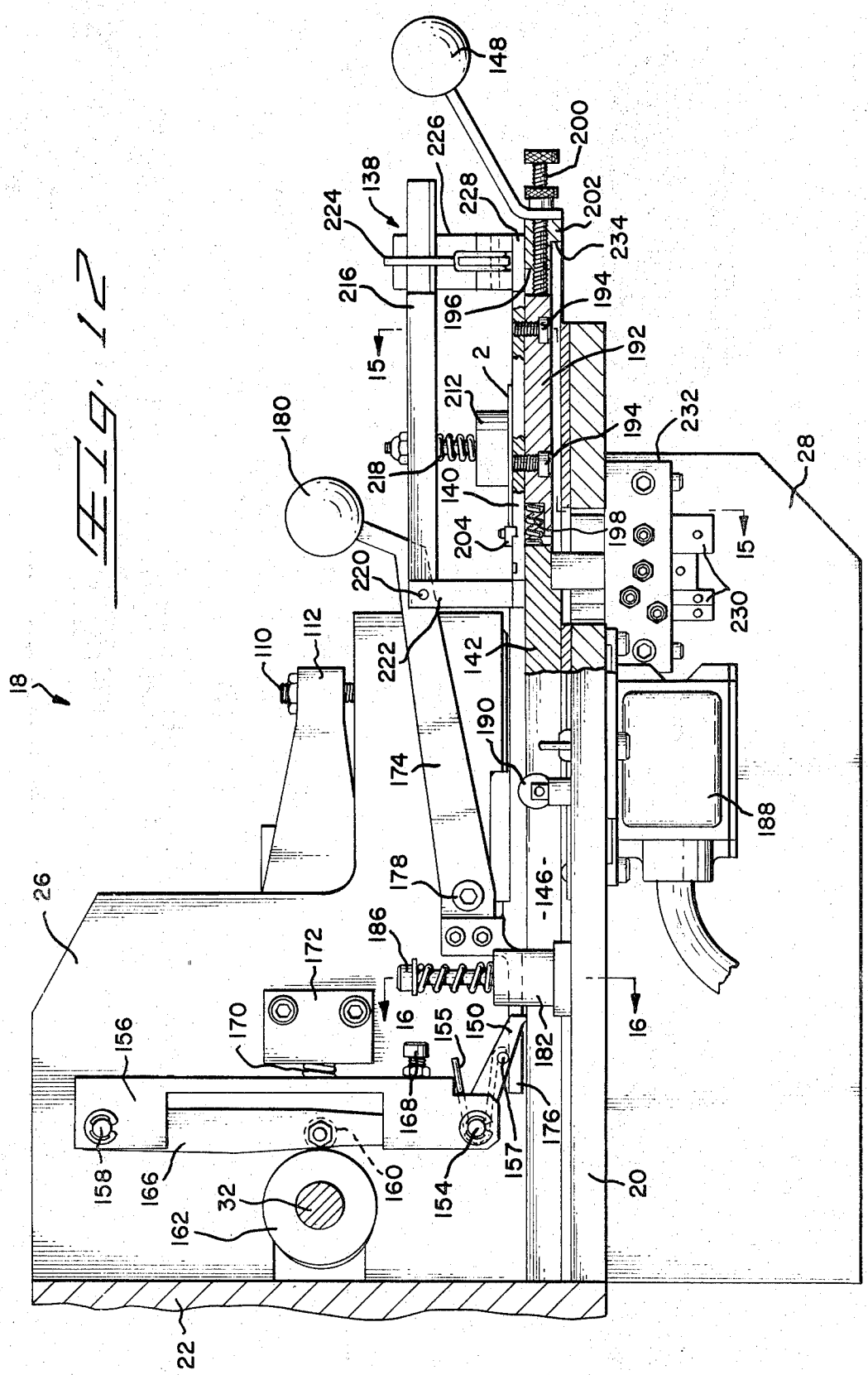

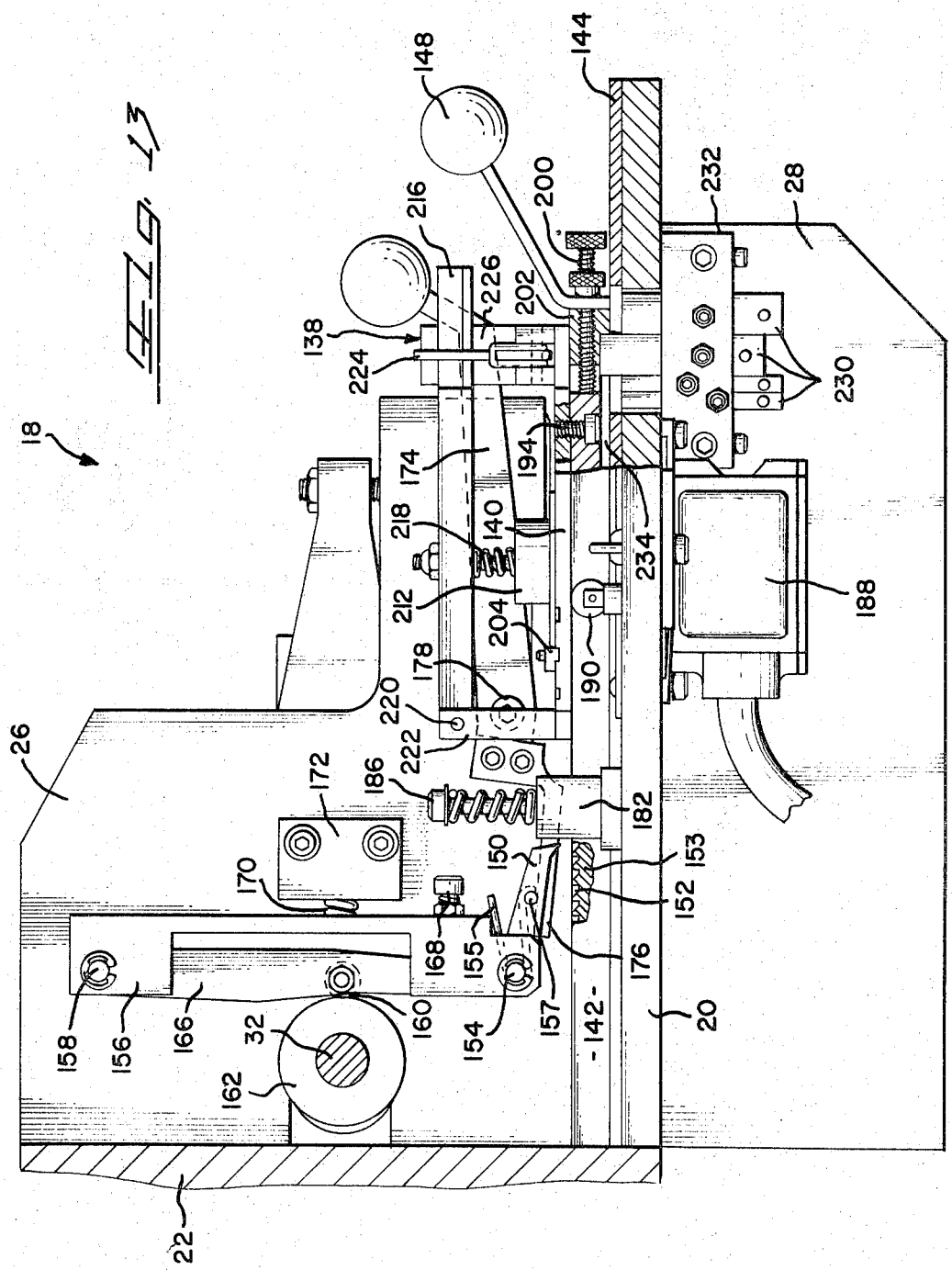

United States Patent Office 3,553,836
Patented Jan. 12, 1971

3,553,836
METHOD AND APPARATUS FOR TERMINATING CABLE
Harold Edwin Cootes, Harrisburg, Pa., assignor to AMP Incorporated, Harrisburg, Pa.
Continuation-in-part of application Ser. No. 733,620, May 31, 1968. This application May 21, 1969, Ser. No. 826,645
Int. Cl. H01r 43/00, 43/04
U.S. Cl. 29—628
11 Claims

ABSTRACT OF THE DISCLOSURE

Flat electrical cable, having a plurality of parallel side-by-side conductors, is terminated by apparatus having crimping die and crimping anvil which are movable relatively towards each other to crimp a terminal onto a conductor of the cable. Apparatus has means for feeding terminals to the crimping die and anvil and also means for feeding the cable along a path extending between the die and anvil thereby to position a conductor in alignment with the die and anvil and with a previously fed terminal. Cable feeding means is arranged such that the end conductor of the cable is precisely located with respect to the die and anvil. During operation of the apparatus, cable is fed by a distance equal to the center-to-center spacing of the cable thereby to successively position the conductors of the cable in the crimping zone. A method of aligning the cable in the apparatus is also disclosed which compensates for dimensional irregularities in the cable.

BACKGROUND OF THE INVENTION

This application is a continuation-in-part of application Ser. No. 733,620, filed May 31, 1968, now abandoned. Flat cables, such as flexible flat conductor cable and flexible printed circuits, have been commonly known and available for some years, however, the use of such conductors has been limited because of the fact that previously available terminating techniques are not directly applicable to such conductors. The term "flexible flat cable" is generally understood to refer to a cable having a plurality of parallel side-by-side ribbon-like conductors laminated between sheets of a suitable insulating film such as Mylar (polyethyleneterephthalate). The term "flexible printed circuit" is usually understood to refer to a device comprising a plurality of conductors laminated between sheets of suitable plastic which is adapted to receive electronic components on its surface. The conductors of such flexible printed circuits usually extend to an edge of the device so that the same termination problems exist for flexible printed circuit as exist for flat conductor cable. Ribbon cable, another form of flat conductor cable, comprises individual wires in side-by-side relationship which are bonded to each other. The term "flat conductor cable" is employed in a generic sense in this description of the instant invention and is intended to encompass all types of flat flexible conductor cables.

The present invention is directed generally to the automatic or semi-automatic termination of the conductors of flat conductor cables or the like. It is accordingly an object of the invention to provide an improved method of terminating flat conductor cables. A further object is to provide an improved apparatus for terminating flat conductor cable or the like which incorporates both a cable feeding means and a terminal strip feeding means. A still further object is the provision of an apparatus for terminating flat conductor cable having improved means for aligning the cable in the apparatus so that the contact terminals will be mounted on the conductors of the cable. A still further object is to provide an improved means of feeding flat conductor cable or the like through a terminating machine to position the conductors of the cable between the crimping members of the crimping machine.

These and other objects of the invention are achieved in a preferred embodiment thereof comprising an applicator having a crimping die and a crimping anvil located in a crimping zone and movable relatively towards and away from each other. Contact terminals, in the form of a continuous ladder strip, are fed towards the crimping zone so that the leading terminal of the strip is located between the crimping die and the crimping anvil. A cable feeding means is also mounted adjacent to the crimping zone and adapted to advance the cable, during each operating cycle, laterally of its axis a distance equal to the center-to-center spacing of the conductors of the cable so that during each operating cycle, one of the cable conductors will be located in alignment with the dies and in alignment with a previously fed terminal. During the operating cycle, the leading terminal of the strip is severed from the strip and inserted through the cable in substantially straddling relationship to a conductor. The terminal is thereafter crimped onto the cable in a manner such that it makes electrical contact with a conductor.

A significant feature of the invention is that the cable, at the beginning of the operating cycle for a given cable, is positioned precisely in the apparatus in a manner such that as the cable is fed, the successive conductors therein will be precisely located relative to the crimping die and anvil for the crimping operation. In the disclosed embodiment, such precise positioning of the cable is achieved by means of an aligning jig which locates the cable at a precise location relative to the crimping dies. By virtue of this precise alignment of the cable in the apparatus and the automatic nature of the feeding and crimping operations carried out, a high rate of application of terminals to the cable is achieved with a minimum of manual operations on the part of the technician.

In the drawing:

FIG. 1 is a perspective view of an apparatus for applying contact terminals to flat conductor cable in accordance with the invention.

FIG. 2 is a perspective view of a short section of flat conductor cable having contact terminals on its end.

FIG. 3 is a perspective view of a short section of cable having contact terminals secured to its conductors at intermediate locations.

FIG. 4 is a perspective view of a short section of contact terminal strip of a type adapted to be applied to conductor cable by the apparatus of FIG. 1.

FIG. 5 is a plan view of the terminal applying section and the cable feeding section of the apparatus of FIG. 1.

FIG. 6 is a side view showing the terminal applying section of the apparatus.

FIG. 6A is a view taken along the lines 6—6 of FIG. 6.

FIG. 7 is a perspective exploded view of the crimping die and crimping anvil of the apparatus and the structure immediately associated therewith.

FIGS. 8, 9 and 10 are fragmentary frontal views showing the crimping die and anvil and illustrating the positions of the parts during successive stages of the crimping operation.

FIG. 11 is a view taken along the lines 11—11 of FIG. 9.

FIG. 12 is a side view showing the jig for holding the cable and the cable feeding mechanism, the jig being in its outward position in this view.

FIG. 13 is a view similar to FIG. 12 but showing the position of the cable aligning jig at the start of a cable terminating operation.

Figure 13A:
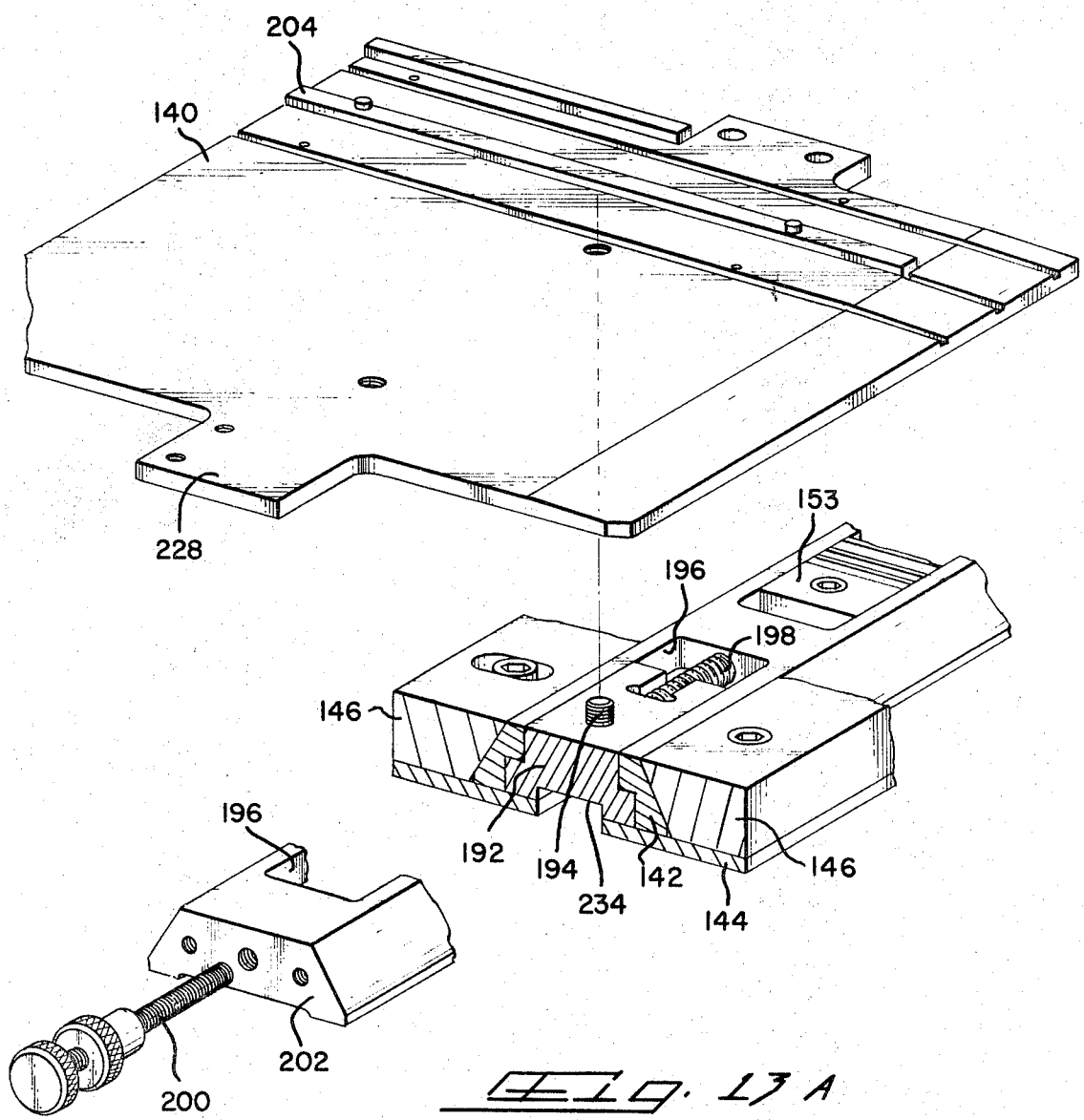
FIG. 13A is a perspective view showing portions of the cable aligning jig and the rack bar on which it is mounted.

FIGS. 15 and 16 are views taken along the lines 15—15 and 16—16 of FIG. 12.

Referring first to FIGS. 2–4, a typical flat conductor cable 2 comprises a plurality of parallel ribbon conductors 4 laminated between sheets of suitable insulating film such as Mylar (polyethyleneterephthalate). Cables of this type are manufactured in varying widths, having varying numbers of conductors and having conductors of different sizes. While the invention is herein disclosed in an embodiment relating to flat conductor cable of the type shown, it will be understood that the principles of the invention are applicable to similar types of flat cable such as ribbon cable or flat flexible printed circuits.

In FIG. 2, two of the conductors have contact terminals 8 applied thereto, these contact terminals having a contact pin 10 at one end and having parallel sidewalls 9 at their other ends which are crimped onto the conductors of the cable in a manner which will be described below. The terminals may also be crimped onto an intermediate portion of the cable as shown in FIG. 3.

Terminals of the type shown are advantageously manufactured by stamping and forming operations as a continuous strip (FIG. 4) having parallel carrier strips 14, 14' connected together at spaced intervals by transversely extending rungs 16. The terminals 8 are integral with the carrier strip 14 and are located between each adjacent pair of rungs 16. In accordance with the principles of the instant invention, both the flat cable 2 and the strip 12 are fed towards a crimping zone in which an individual terminal 8 is removed from the strip and crimped onto a conductor in the cable.

Figure 14:
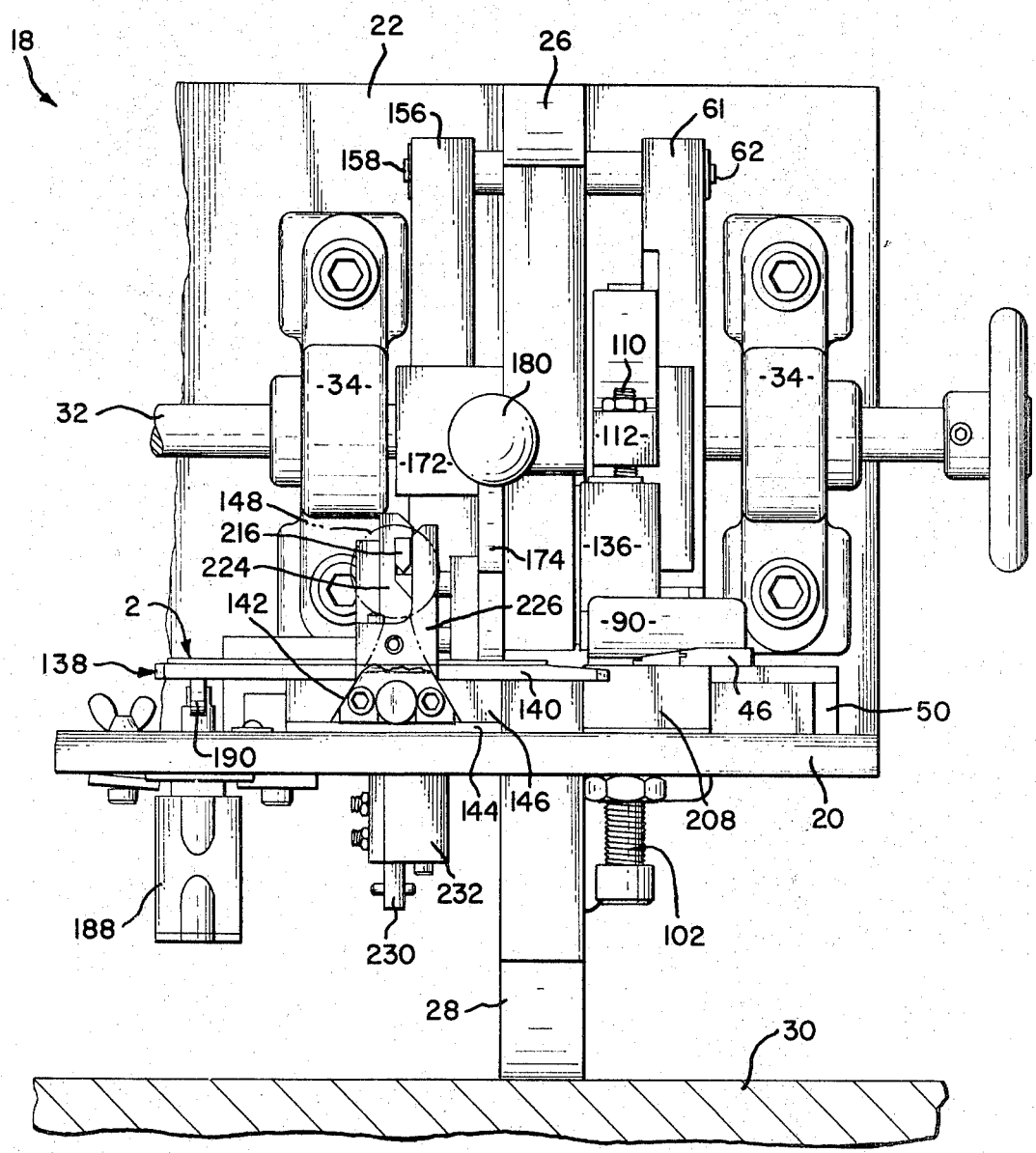
FIG. 14 is an end view of the apparatus.

Referring now to FIG. 1, a preferred form of applicator 18 for crimping terminals as described above onto the conductors of a flat conductor cable comprises a frame including a base plate 20, vertical side frame plates 22, 24, and a central vertical frame plate 26 which extends below the surface of the base plate 20 as shown at 28 (FIG. 14) to support the apparatus on a suitable surface 30 of a bench or the like. Additional supporting means may be provided on the underside of the base plate where required.

The various mechanisms described below are actuated by a cam shaft 32 extending parallel to the frame plate 22 and supported in pillow block bearings 34. This shaft is coupled by means of a sprocket and chain 36 to a continuous duty motor 38 mounted behind (as viewed in FIG. 1) the vertical plate 22. An electrically actuated clutch 40 is provided on the cam shaft 32 and is controlled by suitable circuitry which may be contained in a housing 42 on the upper surface of the base plate 20. As will be explained more fully below, when a cable containing multiple conductors is being terminated, the cable is placed in the apparatus, the clutch 40 is engaged, and the terminals are repetitively applied to the conductors until all of the conductors have been terminated. The clutch is then disengaged by a switch which is opened automatically.

The individual contact terminals are applied to the conductors of the cable in a crimping zone generally indicated at 44 and the terminal strip 12 is guided towards this zone through the vertical frame plate 22 by means of right and left guide members 46, 48, FIGS. 6, 6A. These guide members are mounted on a suitable spacer or support block 50 secured to the upper surface of the base plate 20 and have grooves in their opposed edges as shown in FIG. 11 which receive the carrier strips 14, 14'.

Feeding of the terminal strip is accomplished by means of a feed finger 56 (FIG. 6) on the end of a feed arm 58 which extends parallel to, and beside, the vertical frame member 26. The end of this feed arm is pivotally connected at 60 to the lower end of a feed lever 61 which extends upwardly beside the frame member 26 and is pivoted thereto at 62. A cam follower 64 on the arm 61 intermediate its ends bears against the surface of a cam 66 on the cam shaft 32, the contour of this cam being such that during each complete revolution of the cam shaft the feed finger and feed arm 58 are pivoted leftwardly and then retracted under the influence of a spring 72 interposed between the lower end of the feed arm and a block 74 fixed to the frame member 26. In the embodiment shown, the cam follower is adjustably mounted on the feed arm 61 by means of a separate bar 68 which is contained within a recess of the feed arm and which is adjustable with respect thereto by means of an adjusting screw 70. This arrangement permits adjustment of the limits of the stroke of the feed finger so that the leading terminal of the terminal strip can be precisely positioned between the crimping die and anvil.

The righthand strip guide member 46 extends slightly past the crimping zone as shown in FIGS. 5 and 6A while the lefthand guide member 48 extends up to a fixed guide block 76 secured to the surface of frame member 26. The underside of the lefthand guide is cut away at its end (see FIG. 11) and a shear bar 45, which also serves a strip guiding function, overlaps the strip guide on its underside. This shear bar is secured to the frame member 26 by a bracket 43 and extends in back of, and past, the crimping zone 44. The lefthand guide member 48 is provided with a slot 49 on its end through which the feed finger extends to engage the pilot holes in the carrier strip 14 and the shear bar 45 is provided with a groove 49 into which the end of the feed finger extends.

In order to prevent retractile movement of the strip when the feed finger is withdrawn, an elongated pawl 80 is provided in a recess 82 on the underside of the fixed guide block 76 and pivoted to this guide block by a pin 84. Pawl 80 is biased in a clockwise direction, as viewed in FIG. 7, by means of a spring 86 interposed between the underside of the block 76 and the upper surface of the pawl. A dog 88 on the lower side of the pawl bears against the carrier strip 14 and enters the adjacent pilot hole after the strip has been fed to accurately locate the leading terminal between the die and anvil and to prevent the strip from being pulled rightwardly, as viewed in FIG. 6, when the feed finger is retracted.

The leading terminal of the strip is sheared from the strip in the crimping zone by movement of the crimping die rib 106 past the shear bar 45. The scrap carrier strips 14, 14', and rungs 16 are thereafter fed leftwardly in FIG. 6 from the crimping zone. Advantageously, a deflector plate 90 is mounted adjacent to the crimping zone to guide this scrap metal way from the crimping zone to a suitable receptacle.

The crimping anvil 92, against which the sidewalls 9 of the terminal are forced during the crimping operation, is mounted in a recessed anvil support block 94 on the upper surface of the plate 20, (see FIGS. 9 and 11). The upper surface 96 of the anvil is provided with a pair of parallel semicircular grooves 98 which cause the sidewalls 9 of the terminal to be bent inwardly and towards each other and onto the conductor of the cable. In the disclosed embodiment, the anvil is held against the anvil block by means of a locking screw 100 which extends through an oversize hole in the anvil, an adjusting screw 102 with a suitable locknut thereon being threaded through the plate 20 and bearing against the under side of the anvil to permit precise adjustment of the anvil to achieve an optimum crimped connection.

The crimping die 104 comprises a relatively thin plate having a rib 106 extending centrally down its rearward side as viewed in FIG. 7 and having a lower surface which is adapted to move against a terminal to shear it from the strip and force the terminal sidewalls 9 through the cable and towards the anvil. The upper end of the crimping die 104 is secured by suitable fasteners to a thrust block 108 which is engaged by a threaded rod 110 extending downwardly through a rocker arm 112. This rocker arm extends beside and parallel to, the plate 26 and is pivoted intermediate its ends at 114 in a recess in the previously identified fixed block 74. The righthand end of the rocker arm, as viewed in FIG. 6 has a cam follower 116 mounted thereon which is in engagement with a cam 118 on the cam shaft 32. A spring 119, interposed between the underside of the rocker arm and the block 74, normally biases the rocker arm 112 in a clockwise direction as viewed in FIG. 6. It will thus be apparent that during each complete revolution of the cam shaft 32, the rocker arm will be swung through a slight counter-clockwise arc by a cam 118 and will be returned to its initial position by the spring.

The leading terminal of the strip is guided downwardly toward the anvil, during downward movement of the crimping die, by the opposed edges 120 of a pair of guide fingers 122 which are mounted for limited pivotal movement at their upper ends on pins 124 extending from a block 126. The lower ends of these fingers are inclined inwardly and towards each other and received within a triangular recess 123 in the face of the fixed guide block 76. The sides of this recess are tapered inwardly and toward each other to a slightly greater degree than the sides of the fingers so that when the blocks 126 is moved downwardly, the lower ends of the fingers are moved inwardly and towards each other. After the fingers have been cammed inwardly, their opposed edges 120 define a precise guide path for the terminal while it is being pushed towards the cable. When the block 126 later moves upwardly, the lower ends of the fingers move away from each other thereby releasing the crimped connection and obviating any tendency of the connection to remain wedged between the fingers. The need for a knock-out device, of the type frequently needed in crimping presses, is thus avoided. The rib portion 106 of the crimping die extends into the recess between the edges 120 so that this member is also guided by the guide fingers.

The block 126 is disposed above the upper surface 130 of the fixed guide block 76 with a compression spring 128 interposed between the surface of the fixed block and the lower surface of the block 126. Additionally, a compressible resilient block of rubber-like material 132 is interposed between the lower side of the thrust block 108 and the surface of a recess 134 in the upper end of the block 126. The entire assembly including the crimper, thrust block 108, the block 126, and the compressible block 132 are contained within a U-shaped guide block 136 mounted against the surface of the frame member 26.

The manner in which the leading terminal of the strip is sheared from the strip and crimped onto a conductor positioned above the anvil is illustrated best in FIGS. 8–11. At the beginning of the crimping cycle, the crimping die and the guide fingers will be disposed above the previously fed terminal and a conductor of the cable will be disposed on the surface of the anvil and between the grooves 98. As the rocker arm 112 is swung through a slight counterclockwise arc and the threaded rod 110 pushes the thrust block 104 downwardly, the crimping die moves against the upper surface of the terminal and the spring 128 (which is more easily compressed than the resilient block 132) is compressed until the block 126 moves against the upper surface 130 of the guide block 76. During this interval the guide fingers 122 will move downwardly on each side of the terminal and substantially against the cable 2 so that they will define the previously discussed guide path for the terminal. Thereafter, and upon further counterclockwise movement of the rocker arm 112, the crimping die moves downwardly with concomitant compression of the block 32, and the terminal is sheared from the strip and moved downwardly until the sidewalls of the terminal pierce the insulation of the cable on each side of the conductor. During the final stages of the crimping operation, the sidewalls pierce the insulation of the cable and are curled inwardly and towards each other to establish electrical contact with the conductor as explained in U.S. Pat. 3,395,381.

When the rocker arm 112 returns to its intial position under the influence of the spring in the block 74, the crimping die 104, the thrust block 108, and the block 126 are returned to their initial positions (FIG. 8) by the spring 128 and the resilient compressible block 132.

During a complete operating sequence during which all of the conductors in a given cable are terminated, both the terminal strip and the cable must be fed intermittently towards the crimping zone. The cable which is being terminated is clamped in a jig 138, which will be described in detail below, and against the upper surface of a plate 140 which is part of the jig. The jig 138 is mounted on a slidable rack 142 (FIGS. 1, 5, 12, 13A) which extends parallel to, and beside, the frame member 26 on the lefthand side thereof as viewed in FIG. 5. As shown in FIG. 13A, rack 142 is supported on a spacer plate 144 between gibs 146 secured to the spacer plate and the base plate 20. A handle 148 is secured to the righthand end 202 of the rack 142 as viewed in FIG. 13 to assist the operator in moving this rack from its extended position of FIG. 12 to its retracted position, FIG. 13, which it occupies at the beginning of a cable terminating operation.

After the operator positions the cable on the surface of the plate 140, he moves the rack from the position of FIG. 12 to the position of FIG. 13 so that the end conductor in the cable will be approximately located between the crimping die and anvil. During each complete revolution of the cam shaft 32, the rack is fed by a distance precisely equal to the spacing between adjacent conductors of the cable by means of a feed finger 150 which is adapted to engage teeth 152 on the upper surface of an insert 153 mounted in the rack.

Feed finger 150 is pivotally connected at 154 to a feed lever 156 which extends upwardly past the cam shaft 32 and is pivoted at its upper end 158 to the frame member 26. A cam follower 160 on the lever 156 is in constant engagement with a cam 162 on the cam shaft so that the lever will be oscillated about its pivotal axis 158 by the cam, the lever 156 being urged against the cam by means of a spring 170 interposed between the righthand side of the lever as viewed in FIG. 13 and a block 172 fixed to the frame member 26. Adjustment of the position of the cam follower 160 is achieved by means of a separate bar 166 mounted in a recess in the lever 156 and adjustable with respect to the feed lever by means of a screw 168 as explained previously with reference to the strip feed lever.

The feed finger 150 is normally biased in a clockwise direction as viewed in FIG. 13, so that its end will lodge between the teeth 152 of the rack, by means of a torsion spring 155 extending around the pivot pin 154 and above a fixed pin 157 in the feed finger. The feed finger can be disengaged from the rack by means of a lever 174 pivoted to the frame plate 26 intermediate its ends at 178 and having one end 176 which extends beneath the pin 157 of the feed finger. When the handle 180 on the righthand end of this lever is pushed downwardly, the feed finger is raised as shown in FIG. 13.

It is preferable to impose a slight frictional drag on the rack bar and this is done by a drag block 182 (FIG. 16) which is mounted by means of an oversized hole on the shank of a screw 186. A portion of this block extends into a recess in the lefthand gib 146 and the lower side of the block is resiliently urged against the rack by a spring which surrounds the screw and bears against the upper surface of the block. The frictional drag imposed by the block is removed when the rack is moved inwardly by an arm extending from the block 182 across the rack and above the end 176 of the lever 174.

As shown best in FIGS. 12 and 13, a switch 188 is mounted beneath the surface of the base plate 20 and has a switch plunger 190 which extends upwardly beside the rack bar. The roller on the end of the switch plunger is adapted to be engaged by the underside of the cable support plate 140 of the jig 138 so that the plunger will be depressed when the rack bar is moved from the position of FIG. 12 to the position of FIG. 13. Depression of this plunger has the effect of energizing the circuitry for engaging the clutch and initiating the cable terminating operation as will be described more fully below.

The jig 138 which holds the cable during the terminating operation comprises the previously identified cable supporting plate 140 which is secured by suitable fasteners 194 to the upper surface of an adjusting block 192 which is disposed in a recess 196 in the rack 142 adjacent to the righthand end 202 thereof, see FIG. 13A. Block 192 is biased rightwardly as viewed in FIG. 12 by means of a spring 198 which bears against one end of the recess 196 in the rack bar and against the adjusting block on the lefthand side thereof. Precise positioning of this block in the rack bar is achieved by means of an adjusting screw 200 which is threaded through the end 202 of the rack and bears against the righthand end of the adjusting block, a suitable locknut being provided as shown to hold the parts in an adjusted position. When a cable is being positioned on the jig, its lefthand edge as viewed in FIG. 12 is located against a positioning bar 204 secured to the upper surface of the support plate for the cable 140. Several selective positions are provided for this positioning bar in order to accommodate several different sizes of cable.

After the cable has been accurately located against the positioning bar 204, it is clamped firmly in position by means of a circular clamping block 212 having a rod extending upwardly therefrom and through an oversized opening in a clamping bar 216, a spring 218 being interposed between the underside of the clamping bar and the clamping block 212. The lefthand end of the clamping bar is pivoted at 220 to a yoke 222 which extends upwardly from the cable support plate 140. The righthand end of this clamping bar is held, when a cable is clamped, by means of a hasp 224 and a latch block 226 which are mounted on an extension 228 of the plate 140. It will thus be apparent, that the cable can be clamped against the upper surface of the plate 140 by merely swinging the clamping bar 216 downwardly towards the upper surface of the plate about its pivotal axis 220 and securing it by the hasp 224 and block latch 226.

In order to accommodate different sizes of cables, that is cables having different widths, the positioning bar 204 can be mounted in any one of several positions. It is also necessary to provide selective stop means for the rack bar 142 in order to posiiton the end conductor of the cable approximately in the crimping zone as will be described below. Selective stop means are provided in the disclosed embodiment in the form of stops 230 which are mounted in a block 232 on the underside of the base plate 20, each of these stops being held in either raised or lowered positions by means of a spring detent device as shown in FIG. 15. When any one of the stops 230 is in its raised position, it extends into a recess 234 on the underside of the rack bar so that when the rack bar is moved inwardly from the position of FIG. 12 to the position of FIG. 13, the righthand end of this recess will move against the stop and prevent further movement of the rack bar. This feature of the disclosed embodiment along with the selective positioning of the positioning bar thus permits cables of several different widths to be terminated in one machine.

After the cable has been clamped in the jig, it is precisely positioned by adjusting the position of the adjusting block 192 with respect to a light hole 206 in an index block 208 mounted on the frame plate 22. A light source 210 is provided in a recess immediately beneath and communicating with the light hole 206 so that the operator by looking downwardly towards the light hole can adjust the screw 200 until a predetermined conductor of the cable is precisely centered with respect to the light hole. It will be noted that the location of the light hole is such that when the jig is in its outermost position (FIG. 12), a central conductor, preferably the central conductor, is disposed generally above the light hole and will be precisely centered with respect to the light hole by adjustment of the screw. The significance of this feature is explained immedaitely below.

Flat conductor cables of the type generally available are made within relatively precise dimensional tolerances and the spacing between adjacent conductors of the cable will vary by only a very slight amount. However, while the spacing between any two conductors of a cable may lie within precise and exacting tolerances the tolerance variations can accumulate from one side of the cable to the other side rather than cancel each other out. For example, a cable might have a nominal center-to-center spacing for the conductors of 0.010" with a tolerance variation of ±0.001". If all of the conductors of the cable lie on the positive side of the permissible tolerance variations, (i.e. have an actual center-to-center spacing of 0.011") the conductors on the sides of the cable will be spaced apart by an amount substantially greater than the product of the nominal spacing times the number of conductors in the cable.

It follows that if a side conductor is used for aligning purposes and the cable is fed during each operating cycle by a distance precisely equal to the center-to-center spacing of the conductors, and further if the conductors are spaced apart by a distance slightly greater than the nominal center-to-center spacing, the terminals applied to the cable will be progressively misaligned with the conductors so that the last terminal to be applied to the last conductor terminated may be substantially out of alignment with its conductor.

In accordance with the present invention, a center conductor is employed for indexing purposes rather than an edge conductor and the position of the light hole with respect to the positioning bar 140 is such that the center conductor will be precisely located with respect to the die and anvil after the jig has been moved into its operative position and the cable has been fed a number of increments equal to the number of conductors between the center or indexing conductor and the end conductor. In this manner, any accumulated tolerance variations in the cable are substantially cancelled out and all of the terminals will be centered sufficiently with respect to the conductors to which they are attached to establish electrical contact therewith and to avoid shorting between adjacent terminals. For example, for a given cable having the center-to-center spacing of its conductors deviating from the nominal spacing on the positive side of the permissible tolerance variations, the terminal applied to the conductor on one side of the cable might be very slightly misaligned with respect to its conductor but not sufficiently misaligned to interfere with the electrical connection between the terminal and the conductor. The terminal crimped onto the central conductor will be precisely aligned with that conductor and the terminal crimped onto the conductor at the other edge of the cable will again be very slightly misaligned.

Depending on the exact sequence of the crimping and feeding operations of the apparatus, the edge conductor, to which the first terminal is applied, should either be between the crimping die and anvil or spaced from the center line of the die and anvil by a distance equal to the center-to-center spacing of the conductors of the cable. If the apparatus is timed to carry out a crimping operation immediately after it is started, the edge conductor should be located between the die and anvil; if the apparatus is timed to feed the cable a distance equal to the pitch of the conductors before the first crimping operation, the edge conductor should be spaced from the die and anvil by an amount equal to the length of the feed stroke.

The method of centering the cable in the machine can be described as follows using symbols for the variables involved. Assuming that $s$ is the nominal center-to-center spacing between adjacent conductors of the cable and that $s\pm$ represents the actual spacing (the $\pm$ representing the variations due to manufacturing tolerances), the cable is centered in the machine by selecting an $n$th conductor of the cable and locating this conductor a distance $(n-1)s$ from the crimping die and anvil. The first conductor will then be between the die and anvil so that upon actuation of the machine, a terminal will be crimped onto this first conductor. During each cycle, the cable is fed by a distance equal to $s$ and a terminal will therefore be crimped onto each conductor.

As noted above, the location of the $n$th conductor with respect to the crimping die and anvil should be $ns$ rather than $(n-1)s$, if the machine is programmed to initially feed the cable then crimp a terminal rather than crimp a terminal onto the cable prior to feeding.

A salient feature of the invention is the provision for feeding both the flat conductor cable and the terminal strip during each single operating cycle. As a result, flat conductor cables having 20 or 30 conductors therein can be terminated automatically, by merely properly positioning the cable in the aligning jig, moving the aligning jig inwardly as described above, and engaging the clutch. Durng each revolution of the cam shaft, both operations of feeding the cable and applying a terminal to one of the conductors are carried out. A further salient feature of the invention is the manner in which the cable is aligned or positioned with respect to the crimping die and anvil as discussed above. By virtue of this feature, the tolerance variations of the spacing between conductors do not interfere with the automatic termination technique.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. Apparatus for applying contact terminals to flat cable, said cable comprising a plurality of side-by-side parallel conductors, said apparatus comprising:
   an applying zone having means therein for applying a terminal to a conductor in said cable,
   cable feeding means and terminal strip feeding means, said cable feeding means being effective to feed said cable during each operating cycle a distance equal to the spacing between adjacent conductors of said cable, said strip feeding means being effective to feed a strip of said contact terminals towards said zone to locate the leading terminal of said strip in alignment with a conductor in said cable,
   actuating means for actuating said applying means, said cable feeding means, and said strip feeding means during each operating cycle whereby, terminals on said strip are fed to said zone and applied to the conductors of said cable.

2. Apparatus for crimping contact terminals onto a flat cable, said cable comprising a plurality of side-by-side parallel conductors, said apparatus comprising:
   a crimping zone having crimping means therein for crimping terminals onto the conductors of said cable,
   cable holding means for holding said cable in said zone with an edge conductor of said cable at a predetermined location relative to said crimping means,
   first feeding means for feeding said holding means a distance equal to the spacing between adjacent conductors of said cable,
   second feeding means for feeding a strip of terminals towards said crimping zone and locating the leading terminal of said strip in alignment with said crimping means, and
   actuatng means for actuating said crimping means and said first and second feeding means during each operating cycle whereby,
   terminals of said strip are fed to said crimping zone, said conductors are fed through said crimping zone, and terminals are crimped onto said conductors.

3. Apparatus as set forth in claim 2 wherein said first and second feeding means feed said holding means and said strip along parallel paths in the same direction.

4. Apparatus as set forth in claim 3 wherein said first and second feeding means are on opposite sides of said crimping means.

5. Apparatus as set forth in claim 2 wherein said cable holding means comprises clamping means for clamping said cable, said first feeding means being effective to feed said clamping means through and past said crimping zone.

6. Apparatus as set forth in claim 2 wherein said terminals of said strip are in side-by-side parallel relationship.

7. Apparatus for crimping contact terminals onto flat cable, said cable comprising a plurality of side-by-side parallel conductors, said apparatus comprising:
   a crimping zone having a pair of crimping members therein, said crimping members being normally spaced-apart and being movable relatively towards and away from each other,
   first feeding means for feeding said cable through said crimping zone and locating said conductors of said cable between said crimping members,
   second feeding means for feeding a strip of said contact terminals towards said zone and locating the leading terminal of said strip between said crimping members and in alignment with one of said conductors, and
   actuating means for repetitively actuating said first and second feeding means and crimping means whereby, said cable is intermittently fed through said crimping zone and a terminal from said strip is crimped onto each of said conductors.

8. Apparatus for securing contact terminals onto flat cable or the like comprising:
   a pair of attaching members movable relatively towards and away from each other,
   means for supporting a flat cable in a plane extending between said attaching members,
   means for intermittently feeding said cable along a predetermined path by a distance substantially equal to the nominal spacing between the centers of adjacent conductors of said cable,
   means for locating a central conductor of said cable at a predetermined location on said path, said location being upstream, relative to the direction of movement of said cable along said predetermined path, from the center line of said attaching members and being spaced from said attaching members by an amount such that an end conductor of said cable is located properly with respect to said attaching member for securing a contact terminal to said end conductor whereby,
   during feeding of said cable and securing of terminals to said conductors, tolerance variations in the center-to-center spacing of said cable are averaged out.

9. Apparatus for crimping an open-U type electrical terminal device onto conductor cable, said cable having a plurality of side-by-side conductors, said apparatus comprising:
   a crimping anvil for supporting said cable during crimping of said terminal device,
   a crimping die movable relatively towards and away from said anvil along a predetermined path,
   first and second guide means, one of said guide means being on each side of said path, said guide means providing opposed surfaces extending parallel to, and defining, said path, means for moving said guide means along said path towards and away from said anvil between an open position and a closed position, said guide means having end portions which are adjacent to said anvil in said closed position whereby, upon locating said cable on said anvil and moving said guide means to said closed position and moving said die towards said anvil, said terminal device is guided towards said anvil and crimped onto said cable, and upon movement of said die and said guide means away from said anvil, said cable with said terminal device crimped thereto can be moved with respect to said die and anvil.

10. Apparatus for securing contact terminals onto the conductors of a flat conductor cable, said conductors having a nominal center-to-center spacing $s$, and having an actual center-to-center spacing $s\pm$ the manufacturing tolerances of said cable, said apparatus comprising:

a pair of applicator members, said applicator members being movable relatively towards and away from each other to secure one of said terminals onto a conductor of said cable, supporting means for supporting said cable in a plane extending between said applicator members, feeding means for intermittently feeding said cable a distance equal to said nominal spacing $s$, locating means for locating said cable on said supporting means with a first conductor which is adjacent to one side of said cable substantially between said applicator members and with a central $n$th conductor precisely spaced from said applicator members by a distance $sn'$ where $n'$ is an integer substantially equal to $n$ and equal to at least $n-l$, and actuating means for actuating said feeding means and for moving said applicator members relatively towards and away from each other whereby, during each operating cycle of said apparatus a terminal is applied to one of said conductors and said cable is fed a distance equal to $s$, all of said terminals being at least substantially centered with respect to the conductors to which they are applied.

11. A method of positioning a flat conductor cable in a terminal applicator, said terminal applicator comprising a pair of crimping members movable relatively towards and away from each other and a cable feeding means for feeding said cable towards and past said crimping members, said cable feeding means having a stroke $s$ which is equal to the nominal center-to-center spacing between adjacent conductors of said cable, said method comprising the steps of:

positioning said cable between said crimping members with a centrally located $n$th cable positioned upstream, relative to said cable feed path, by a distance which is substantially equal to $ns$ from said crimping members, moving said crimping members relatively towards each other to crimp a terminal onto the first conductor of said cable, feeding said cable by an amount equal to $s$, and crimping a terminal onto the second conductor of said cable, and repeating said feeding and crimping steps until contact terminals have been crimped onto all of the conductors of said cable.

References Cited

UNITED STATES PATENTS

| | | | |
|---|---|---|---|
| 3,284,885 | 11/1966 | Fisher et al. | 29—203 |
| 3,376,627 | 4/1968 | Sitz | 29—203 |

THOMAS H. EAGER, Primary Examiner

U.S. Cl. X.R.

29—203